US010089164B2

(12) United States Patent
    Curtis

(10) Patent No.: US 10,089,164 B2
(45) Date of Patent: Oct. 2, 2018

(54) WATCHDOG TIMER

(71) Applicant: Microchip Technology Incorporated, Chandler, AZ (US)

(72) Inventor: Keith Curtis, Gilbert, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 177 days.

(21) Appl. No.: 15/053,504

(22) Filed: Feb. 25, 2016

(65) Prior Publication Data

US 2016/0253233 A1    Sep. 1, 2016

Related U.S. Application Data

(60) Provisional application No. 62/121,780, filed on Feb. 27, 2015.

(51) Int. Cl.
    *G06F 11/07*       (2006.01)
(52) U.S. Cl.
    CPC ...... *G06F 11/0757* (2013.01); *G06F 11/0721* (2013.01)
(58) Field of Classification Search
    CPC .............................. G06F 11/07; G06F 11/0757
    USPC ......................................................... 714/55
    See application file for complete search history.

(56) References Cited

U.S. PATENT DOCUMENTS

| 4,879,647 | A | * | 11/1989 | Yazawa | ............... | G06F 11/0757 |
| | | | | | | 368/121 |
| 4,956,807 | A | * | 9/1990 | Hosaka | ............... | G06F 11/0757 |
| | | | | | | 713/502 |
| 6,260,162 | B1 | * | 7/2001 | Typaldos | ............ | G06F 11/0757 |
| | | | | | | 714/25 |
| 8,375,258 | B1 | * | 2/2013 | Sheets | ................. | G06F 11/0721 |
| | | | | | | 714/55 |
| 2003/0037172 | A1 | * | 2/2003 | Lacombe | ............ | G06F 11/0757 |
| | | | | | | 719/310 |
| 2003/0204792 | A1 | * | 10/2003 | Cahill | ................. | G06F 11/0757 |
| | | | | | | 714/55 |
| 2005/0114732 | A1 | * | 5/2005 | Janin | ................... | G06F 11/0757 |
| | | | | | | 714/30 |

(Continued)

FOREIGN PATENT DOCUMENTS

GB          2310514 A       8/1997      .............. G06F 11/00

OTHER PUBLICATIONS

Barr, Michael, "Introduction to Watchdog Timers," URL: http://www.embedded.com/electronics-blogs/beginner-s-corner/4023849/Introduction-to-Watchdog-Timers, 5 pages, Oct. 1, 2001.

(Continued)

*Primary Examiner* — Kamini B Patel
(74) *Attorney, Agent, or Firm* — Slayden Grubert Beard PLLC

(57) ABSTRACT

A microcontroller may comprise a central processing unit coupled with a plurality of peripheral devices through a system bus; and a watchdog timer unit receiving a clear watchdog signal and being configured to generate a watchdog timeout signal for resetting the microcontroller, wherein the watchdog timer unit is further configured to define a first and a second watchdog timeout period through a first and a second timer, respectively, further having logic to select the first or the second timer, wherein the clear watchdog signal resets the first and second timer.

25 Claims, 3 Drawing Sheets

(56) References Cited

U.S. PATENT DOCUMENTS

2008/0229158 A1* 9/2008 Saito ................... G06F 11/0757
    714/55
2008/0276132 A1* 11/2008 Majewski ........... G06F 11/0757
    714/55
2015/0278002 A1* 10/2015 Aoki ................... G06F 11/0739
    714/55

OTHER PUBLICATIONS

International Search Report and Written Opinion, Application No. PCT/US2016/019813, 10 pages, dated May 30, 2016.

* cited by examiner

WATCHDOG TIMER

RELATED PATENT APPLICATIONS

This application claims priority to commonly owned U.S. Provisional Patent Application No. 62/121,780 filed Feb. 27, 2015; which is hereby incorporated by reference herein for all purposes.

TECHNICAL FIELD

The present disclosure relates to watch dog timers, in particular watch dog timers used in microcontrollers.

BACKGROUND

Watchdog timers are peripheral devices which are used to monitor the correct performance of a processor. They are often an integrated peripheral in a microcontroller. A watchdog timer once set is basically a timer that counts for a predetermined time. Once the predetermined time is expired the watchdog timer will generate a reset which sets the monitored device back into a known state. A program needs to reset the watchdog timer periodically to its start condition to ensure that no such reset occurs. Thus, only when the program malfunctions the watchdog timer will not be reset and therefore cause a system reset once its time limit has been reached.

Thus, watchdog timer are generally used in microcontroller devices and in computer systems to provide a control mechanism that prevents a system from acting erratic if for unknown reasons the microprocessor deviates from the programmed execution flow. According to a specific embodiment of a watchdog timer, a watchdog timer is set to count down from a predetermined number and the executed program includes reset instructions at specific points within the program that prevent an overrun of the watchdog by resetting it to the predetermined number. Once the watchdog timer overruns it will generate a reset or interrupt to allow the system to recover. During program execution when everything performs perfectly, the watchdog timer will never overrun. However, any malfunctioning for whatever reasons that lock up the microprocessor or microcontroller or deviate the execution of the programmed instructions will cause the watchdog timer to overrun and the system will be reset.

SUMMARY

Conventional watchdog timers have a fixed period of operation prior to generating a reset. If the watchdog timer is correctly reset it will not fire and operation continues. Some versions of watchdog timers allow an unlock code to prevent operation of the watchdog timer.

However, there are certain circumstances during which such a reset is not wanted and the watchdog timer has to be deactivated. While a watchdog timer could be deactivated by software according to conventional systems and such a creation of a software disabled WDT is believed to be a reasonable compromise to allow extending of the WDT timeout, unfortunately this compromises the integrity of the timer and opens the door for potential corruption by misbehaving code. Thus, software controlled shutoff of a watchdog timer limits reliability of a watchdog timer as a supervisory system. If the watchdog timer is active, it can fire while the MCU is waiting for oscillator startup and/or the execution of long configuration code. Also, a graceful power down code operation may not be possible with an active watchdog. Hence, there is a need for an improved watchdog timer.

According to an embodiment, a watchdog timer unit can be configured to define a first and a second watchdog time period, wherein the watchdog timer unit is configured, after activation of the watchdog timer unit, to automatically select the first watchdog time period until a first clear watchdog signal has been received whereupon the watchdog timer unit switches to the second watchdog time period.

According to a further embodiment, the first watchdog time period can be endless. According to a further embodiment, the watchdog timer unit may further comprise a flip-flop being controlled by the clear watchdog signal and having an output controlling a switch that couples a reset output of the watchdog timer unit with either the output of a timer or a logic. According to a further embodiment, the first watchdog time period can be defined by a first timer and the second watchdog time period is defined by a second timer, wherein a first clear watchdog signal switches the watchdog timer unit from the first timer to the second timer. According to a further embodiment, the watchdog timer unit may further comprise a flip-flop being controlled by the clear watchdog signal and having an output controlling a switch that couples a reset output of the watchdog timer unit with either the output of the first or second timer. According to a further embodiment, the first watchdog time period can be defined by a first preset value stored in a first register and the second watchdog time period is defined by a second preset value stored in a second register, wherein upon activation of the watchdog timer unit the first register is selected through a switch to preset a watchdog timer and a first clear watchdog signal switches the switch to the second register providing the second preset value to the watchdog timer. According to a further embodiment, the first watchdog time period can be defined by a first clock signal fed to the watchdog timer unit and the second watchdog time period is defined by a second clock signal fed to the watchdog timer unit, wherein upon activation of the watchdog timer unit the first clock signal is selected to clock a watchdog timer and a first clear watchdog signal causes selection of the second clock signal to clock the watchdog timer. According to a further embodiment, the watchdog timer unit according may further comprise a timer configured to be preset through a preset register in a first mode or in a second mode directly thereby bypassing the preset register, wherein upon activation of the watchdog timer unit the timer is preset directly with a first preset value and upon receipt of a first any following clear watchdog signals, the timer is preset through the preset register. According to a further embodiment, the timer can be preset directly through a central processing unit. According to a further embodiment, the timer can be preset directly through a start-up configuration register.

According to another embodiment, a microcontroller may comprise a central processing unit coupled with a plurality of peripheral devices through a system bus; and a watchdog timer unit receiving a clear watchdog signal and being configured to generate a watchdog timeout signal for resetting the microcontroller, wherein the watchdog timer unit is further configured to define a first and a second watchdog timeout period through a first and a second timer, respectively, further comprising logic to select the first or the second timer, wherein the clear watchdog signal resets the first and second timer.

According to a further embodiment of the microcontroller, activation of the watchdog timer unit may be performed automatically when the microcontroller is powered up thereby selecting the first timer and after receipt of a first watchdog timer timeout signal generated by the first timer, the watchdog timer unit is configured to switch to the second timer. According to a further embodiment of the microcontroller, the microcontroller may further comprise an inverter coupled with an output of the second timer, wherein the watchdog timer unit further receives a power fail signal, wherein the logic is further configured to select between the first timer, the second timer and the output of the inverter, and wherein the watchdog timer unit selects the output of the inverter when a clear watchdog signal and a power fail signal is received. According to a further embodiment of the microcontroller, the first watchdog time period can be endless. According to a further embodiment of the microcontroller, the microcontroller may further comprise a flip-flop being controlled by the clear watchdog signal and having an output controlling a switch that couples a reset output of the watchdog timer unit with either the output of a timer or a logic. According to a further embodiment of the microcontroller, the first watchdog time period can be defined by a first timer and the second watchdog time period is defined by a second timer, wherein a first clear watchdog signal switches the watchdog timer unit from the first timer to the second timer. According to a further embodiment of the microcontroller, the microcontroller may further comprise a clock generating unit configured to generate a first clock fed to the first timer and a second clock fed to the second timer. According to a further embodiment of the microcontroller, the microcontroller may further comprise a flip-flop being controlled by the clear watchdog signal and having an output controlling a switch that couples a reset output of the watchdog timer unit with either the output of the first or second timer. According to a further embodiment of the microcontroller, the first watchdog time period can be defined by a first preset value stored in a first register and the second watchdog time period is defined by a second preset value stored in a second register, wherein upon activation of the watchdog timer unit the first register is selected through a switch to preset a watchdog timer and a first clear watchdog signal switches the switch to the second register providing the second preset value to the watchdog timer. According to a further embodiment of the microcontroller, he microcontroller may further comprise a clock generating unit configured to generate a first clock signal and a second clock signal, wherein the first watchdog time period is defined by the first clock signal fed to the watchdog timer unit and the second watchdog time period is defined by the second clock signal fed to the watchdog timer unit, wherein upon activation of the watchdog timer unit the first clock signal is selected to clock a watchdog timer and a first clear watchdog signal causes selection of the second clock signal to clock the watchdog timer. According to a further embodiment of the microcontroller, he microcontroller may further comprise a timer configured to be preset through a preset register in a first mode or in a second mode directly thereby bypassing the preset register, wherein upon activation of the watchdog timer unit the timer is preset directly with a first preset value and upon receipt of a first any following clear watchdog signals, the timer is preset through the preset register. According to a further embodiment of the microcontroller, the timer can be preset directly through the central processing unit. According to a further embodiment of the microcontroller, the timer can be preset directly through a start-up configuration register of the microcontroller.

According to yet another embodiment, a method for monitoring the execution of a program in a microcontroller through a watchdog timer unit defining a time period which after expiration resets the microcontroller wherein expiration of the time period is prevented by periodically resetting the watchdog timer unit, may comprise the steps of: after activation of the watchdog timer unit, the watchdog timer unit automatically starts a first watchdog time period until a first clear watchdog signal has been received; generating a first watchdog reset signal by a central processing unit of the microcontroller; and upon receipt of the first clear watchdog signal and following watchdog reset signals, the watchdog timer unit automatically starts a second watchdog time period which is different than the first watchdog time period.

According to a further embodiment of the method, a power-up of the microcontroller automatically may activate the watchdog timer unit. According to a further embodiment of the method, the first watchdog time period may be endless. According to a further embodiment of the method, the first watchdog time period can be defined by a first timer and the second watchdog time period is defined by a second timer, the method comprising the step of switching the watchdog timer unit from the first timer to the second timer upon receipt of the first clear watchdog signal. According to a further embodiment of the method, the first watchdog time period can be defined by a first preset value stored in a first register and the second watchdog time period is defined by a second preset value stored in a second register, and the method may comprise the step of: upon activation of the watchdog timer unit, selecting the first register to preset a watchdog timer and upon receipt of a first clear watchdog signal, selecting the second register to preset the watchdog timer. According to a further embodiment of the method, the first watchdog time period can be defined by a first clock signal fed to the watchdog timer unit and the second watchdog time period is defined by a second clock signal fed to the watchdog timer unit, and the method may comprise the steps of: upon activation of the watchdog timer unit, selecting the first clock signal to clock a watchdog timer and upon receipt of a first clear watchdog signal, selecting the second clock signal to clock the watchdog timer. According to a further embodiment of the method, upon activation of the watchdog timer unit a watchdog timer may be preset directly with a first preset value and upon receipt of a first and any following clear watchdog signals, presetting the timer through a second preset value stored in a preset register. According to a further embodiment of the method, the method may further comprise: upon receipt of a clear watchdog signal and a power fail signal the watchdog timer unit is configured to maintain a reset signal for predefined time period. According to a further embodiment of the method, the predefined time period can be defined by the second watchdog time period.

DETAILED DESCRIPTION

According to various embodiments, for example, a watchdog timer can be prevented from interrupting a microcontroller while in the process of power up and initialization. Furthermore, the integrity of the watchdog timer can be retained by preventing software disabling of the feature. Finally, a watchdog timer according to various embodiments, can be prevented from interrupting a microcontroller while performing a grace full power down function.

Figure 1:
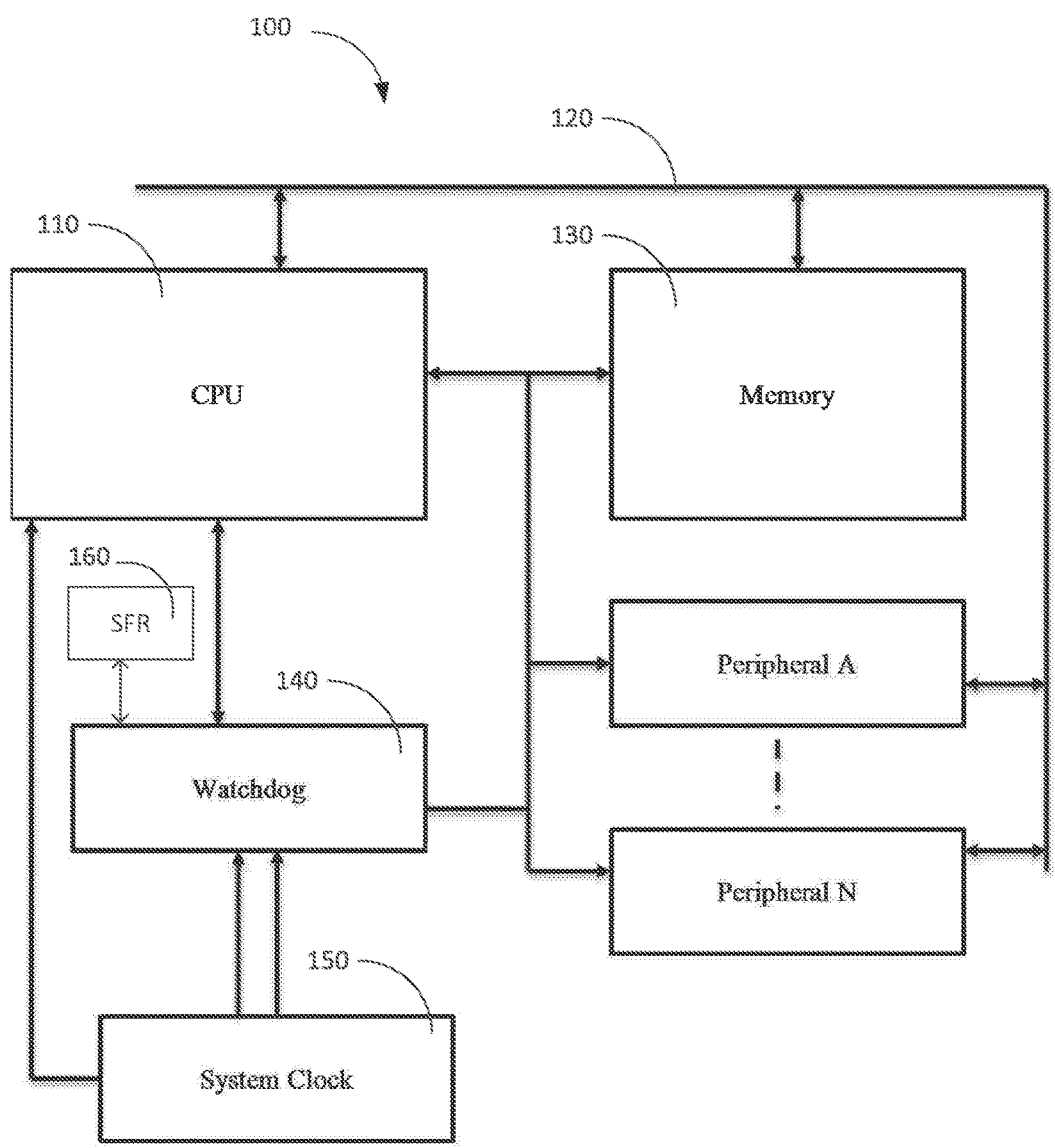
FIG. 1 shows a block diagram of a microcontroller comprising a watchdog timer according to various embodiments.

FIG. 1 shows a block diagram of a typical microcontroller 100. The microcontroller 100 comprises a central processing unit (CPU) 110 coupled with a system bus 120. The CPU is connected to various peripheral devices via the bus 120, for example, a memory 130 and peripherals A . . . N. Furthermore, a watchdog timer peripheral unit 140 is provided and may be coupled directly with the CPU 110 or via system bus 120. A clock system 150 provides clocks for the CPU, the peripherals and may for example provide a separate clock to watchdog timer peripheral 140. The various clocks generated by the system clock unit 150 may also be distributed via the system bus according to some embodiments. The watchdog timer 140 may generate a reset signal that resets all units of the microcontroller 100. Alternatively, the watchdog timer peripheral 140 may send a trigger signal to a reset unit within the microcontroller 100 that is configured to reset the entire system into a known state. The system clock unit 150 may comprise various oscillators that may be operable with or without external components. The watchdog peripheral may according to one embodiment run on the system clock. The watchdog timer peripheral may however as shown in FIG. 1 receive two different clock signals, for example first clock signal and a second clock signal being slower than the first clock signal as will be explained in more detail below. Control functions of the watchdog timer peripheral 140 may be controlled via special function registers that can be memory mapped to the memory to allow an easy access scheme. In particular, a reset of the watchdog may be controlled directly via a dedicated instructions, for example an instruction having the mnemonic "CLRWDT". Alternatively, one or more bits in a special function register may be set to cause a watchdog reset. Other embodiments may control the watchdog timer directly via dedicated watchdog instructions. A mix of special function register control and direct control via dedicated instructions is also possible.

Figure 2:
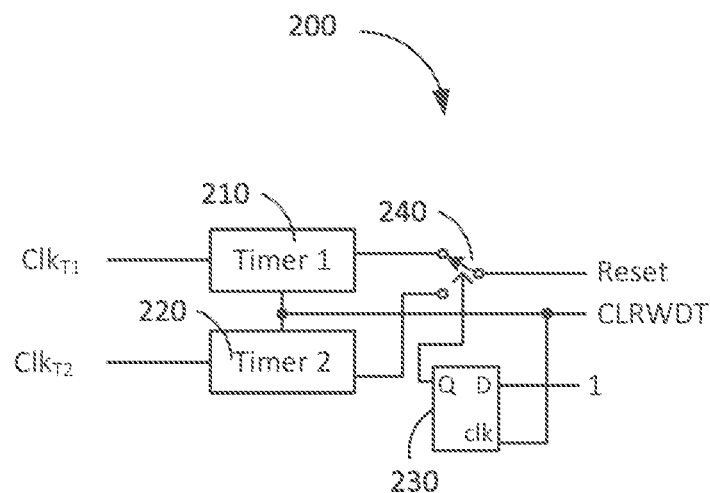
FIG. 2 shows an embodiment of a watchdog timer peripheral having a first and second operating mode.

FIG. 2 shows a more detailed block diagram of the watchdog peripheral shown in FIG. 1. This embodiment comprises a first and second timer 210 and 220 which can be individually programmed to count down predefined first and second timeout periods. The programming through the CPU can be performed via special function registers 160. Also, an automatic setting may be performed by configuration registers used to program certain configuration functions of the microcontroller. The output reset signals generated by the first and second timer 210 and 220 are fed to a two-way switch 240 which is controlled by a flip-flop 230. The flip-flop 230 can be, for example, a D flip-flop receiving a logic "1" at its data input D, wherein its output Q provides the control signal for the two-way switch 240. The CLRWST signal is fed into the clock input of flip-flop 230 and resets the first and second timer 210, 220. The output signal ("Reset") from the two-way switch represents the watchdog timer unit timeout signal which may be further processed by respective logic if necessary to generate the actual reset signal.

This watchdog timer peripheral 200 is therefore embodied as a dual timeout system. Thus, the watchdog timer peripheral 200 according to this embodiment comprises two separate timers 210 and 220. The first timer 210 is used for the initial timeout following a system reset. When the first CLRWDT signal is generated, for example by a dedicated instruction or a special function register as mentioned above, the flip flop 230 swaps to the second timer 220 for normal operation via the switch 240. Here the dual rate watchdog timer peripheral 200 has a first timeout period controlled by the first timer 210 that can be longer than the timeout period of all following period controlled by the second timer 220. However, other setting may apply. Each timer can be programmed individually through the CPU and/or during a start-up configuration. Both timers 210 and 220 may be clocked by the same clock signal which may be any suitable clock signal. For example, the system clock may be used or a separate slower clock signal may be used. Furthermore, as shown in FIG. 2, according to some embodiments, two different clock signals may be used, for example, a first clock signal $Clk_{T1}$ clocks the first timer 210 and a second clock signal $Clk_{T2}$ clocks the second timer 220. The first clock $Clk_{T1}$ may be slower than the second clock signal $Clk_{T2}$. A first longer timeout may be designed to cover an oscillator startup period and initialization code time period. A first feed to the watchdog timer in form of a watchdog reset signal, for example a CLRWDT signal generated by either a dedicated instruction or the setting of at least one bit in a special function register, switches the system to a "normal" timeout period. The normal timeout period can be defined by the second timer 220.

Figure 3:
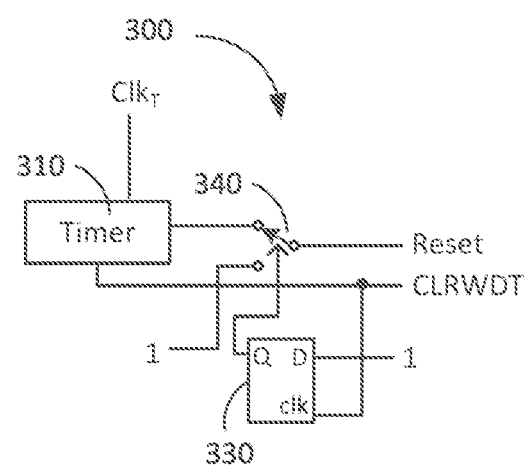
FIG. 3 shows another embodiment of a watchdog timer peripheral.

FIG. 3 shows another possible embodiment of a watchdog timer peripheral 300 with a single timer 310. Timer 310 clocked by clock signal $Clk_T$ provides a reset signal that is fed to two-way switch 340. A second input of the two-way switch 340 is permanently connected to a logic "1". Again, a flip-flop 330 similar to the flip-flop 230 controls the switch 340. The CLRWDT signal resets the timer 310 and is also fed to the clock input of flip-flop 330.

Thus, a similar type of watchdog system as shown in FIG. 2 is shown in FIG. 3, with the exception that the timer 310 will only be enabled after the first CLRWDT has been received, this allows an indeterminate time for startup with indefinite length. To this end, the reset line connected to the output of switch 340 is fixedly coupled with a logic 1 for preventing a reset during start-up wherein after the first CLRWDT signal has been generated the flip-flop 330 switches the output from logic 1 to the output of timer 310 via switch 340. This embodiment creates a first time period of undefined length, in other words the watchdog timer is deactivated by hardware and will be automatically activated by a first watchdog resetting.

Figure 4:
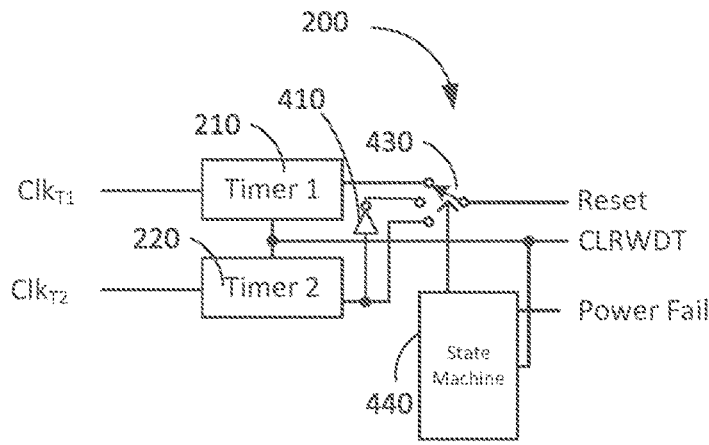
FIG. 4 shows yet another embodiment of a watchdog timer peripheral.

FIG. 4 shows yet another embodiment of a watchdog timer peripheral, wherein a power fail option has been added to the embodiment of FIG. 2. A three-way switch 430 receives output signals from the first timer 210, an inverted output signal from the second timer 220 and a non-inverted output signal from the second timer 220. An inverter 410 is used to invert the output signal of the second timer 220. A state machine 440 is provided which receives the CLRWDT signal as well as a power fail signal and generates an output signal that controls the three-way switch 430. Similar as in FIG. 2, the CLRWDT signal is also fed to the timers 210, 220 and the timers 210, 220 may be either clocked by the same signal or by different clock signals $Clk_{T1}$ and $Clk_{T2}$ as shown in FIG. 4.

The watch dog behaves normally with the first timer 210 and the non-inverted output of the second timer 220 behaving like the dual timer startup system discusses above. However, when the power is about to fail, the system may need to be held in reset until either the power fails, or a reasonable time has passed indicating that the power fail was a false alarm. In that case the reset needs to be released and let the system startup again after a fixed delay. Here the second timer 220 is used in combination with the inverter 410 to generate this logic signal. When a power fail occurs, the system holds the micro in reset using the output signal from inverter 410 by selection of the three-way switch 430 and then releases after the programmed delay. This option basically provides the reverse functionality of a normal watch dog. The state machine comprises a power fail input which allows the state machine to select this option. The power fail device generates and holds an interrupt or reset until the second timeout programmed by timer 220 times out in the event of a CLRWDT in conjunction with a Power Fail event. According to this embodiment, a microcontroller core may request a reset and the reset is held until the power fail signal at the input of the state machine 440 releases which results in the release of the reset signal or a power failure occurs which results in a brown out reset which holds the reset signal through the power down.

Figure 5:
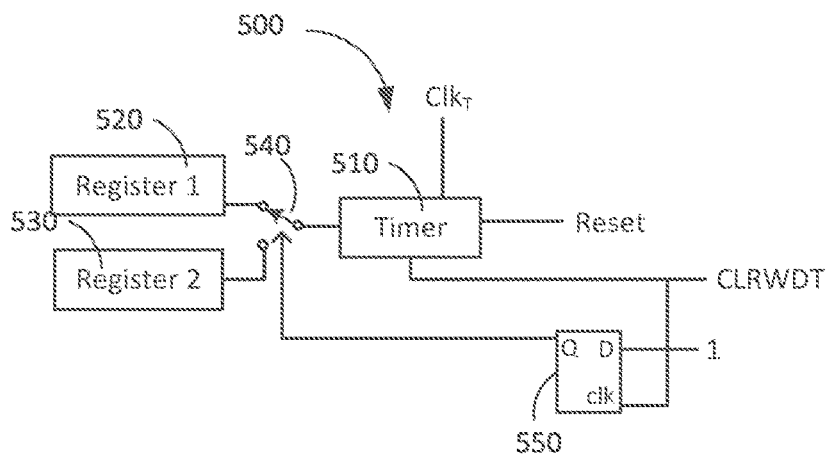
FIG. 5 shows yet another embodiment of a watchdog timer peripheral.

Alternatively, according to other embodiments, a watchdog timer peripheral 500 may comprise a single timer 510 coupled with two or more preset registers 520, 530, each storing a different reset value for the actual watchdog timer as shown in FIG. 5. A switch 540, controlled for example by a flip-flop or state machine 550, similar to FIGS. 2-3, may either couple the first or the second register 520, 530 with a single timer 510 clocked by clock signal $Clk_T$. Thus, different time periods can be generated by programming different reset values into the first and second register 520, 530. Activation of the watchdog timer unit or a power on event selects the first register 520 and preloads the timer with the reset value from the first register 520. Upon occurrence of the first clear watchdog signal the watchdog timer peripheral 500 switches from the first register 520 to the second register 530 and preloads the timer 510 with the value stored in the second register 530. Each following clear watchdog signal will operate with the second register 530. If more than two registers are present different rules may apply and a state machine may be used to control the selection of the registers.

Figure 6:
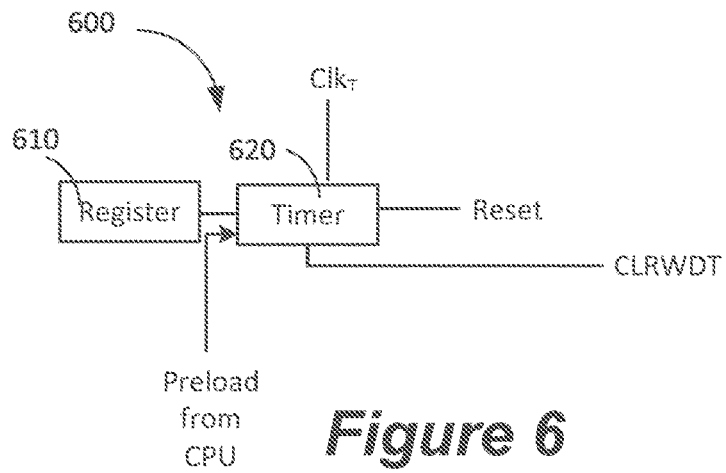
FIG. 6 shows yet another embodiment of a watchdog timer peripheral.ADS_ADS

According to yet another embodiment, the watchdog timer unit 600 may comprise only a single timer 620 and single register 610 storing a reset value as shown in FIG. 6. However, the timer 620 may be designed to allow a direct setting of the preset counter value bypassing the preset register. Due to the fact that the first time period is different than all following time periods, the microprocessor core or a configuration register may directly write the initial start value for the watchdog timer 620 directly upon start-up of the system (power-on). Each time, a clear watchdog signal is received after the power-up, a preset value as stored in the register 610 will be transferred into the watchdog timer thereby resetting the watchdog timer. This solution requires less hardware and still ensures that the first time period is longer than all following time periods.

According to yet another embodiment, a watchdog timer with a single preset register may be used wherein the watchdog timer receives two different clock signals. The first clock signal $Clk_{T1}$ may be slow enough to define a long watchdog period that encompasses the time necessary to initializes the device. Upon receipt of the first CLRWDT signal the system switches to a second clock signal $Clk_{T2}$ that is faster than the first clock signal $Clk_{T1}$ to generate similar time windows as with the embodiment of FIGS. 2, and 4-6.

Any of the solutions disclosed with a single watchdog timer and two defined time periods may be used if the watchdog timer is capable of defining a long enough first period. In case a single watchdog timer cannot be operated to generate the first time period, a solution with two timers may be preferred wherein the first timer may be clocked, for example, with a slower clock signal than the second watchdog timer.

The watchdog timer peripheral as used for the microcontroller may designed to be always active according to some embodiments. The specific design as explained above thus allows for a first long time window suitable for any type of initial configuration. The second and following watchdog resets must then be performed within the defined second window. The fact that the watchdog timer may not be disabled excludes the possibility of any accidental overwrites, for example, by malfunctioning software, that could disable the watchdog peripheral.

The invention claimed is:

1. A watchdog timer unit configured to define a first and a second watchdog time period, wherein the watchdog timer unit comprises a clock input receiving a first and a second clock signal, a watchdog timer and a clock selection unit which is controlled, after activation of the watchdog timer unit, to automatically select the first to clock the watchdog timer until a first clear watchdog signal has been received whereupon the watchdog timer is reset and the clock selection unit selects the second clock signal to clock the timer, wherein the first watchdog time period is set to be longer than the second watchdog time period, and wherein the first watchdog time period is defined by the first clock signal fed to the watchdog timer unit and the second watchdog time period is defined by the second clock signal fed to the watchdog timer unit.

2. The watchdog timer unit according to claim 1, wherein the watchdog timer comprises a first timer receiving the first clock signal and a second timer receiving the second clock signal, wherein a first clear watchdog signal switches the watchdog timer unit from the first timer to the second timer.

3. The watchdog timer unit according to claim 2, further comprising a flip-flop being controlled by the clear watchdog signal and having an output controlling a switch that couples a reset output of the watchdog timer unit with either the output of the first or second timer.

4. The watchdog timer unit according to claim 1, wherein the watchdog timer comprises a single timer clocked by the first clock signal and a first clear watchdog signal causes selection of the second clock signal to clock the single timer.

5. A watchdog timer unit configured to define a watchdog time period and generate a reset signal, wherein the watchdog timer unit comprises a timer receiving a clock signal through a clock input and a flip-flop being controlled by a clear watchdog signal and having an output controlling a switch that couples a reset output of the watchdog timer unit with either the output of the timer or a logic 1, wherein after activation of the watchdog timer unit, the flip-flop is controlled to select the logic 1 until a first clear watchdog signal has been received whereupon the switch is controlled to select the output of the timer and wherein the watchdog timer unit is further configured to reset said timer upon receipt of further clear watchdog signals.

6. A watchdog timer unit configured to define a first and a second watchdog time period, wherein the watchdog timer unit comprises a clock input receiving a clock signal and is configured, after activation of the watchdog timer unit, to automatically select the first watchdog time period until a first clear watchdog signal has been received whereupon the watchdog timer unit switches to the second watchdog time period, wherein the first watchdog time period is set to be longer than the second watchdog time period, wherein the watchdog timer unit comprises a timer configured to be preset through a preset register in a first mode, wherein the preset register comprises bypass logic and wherein in a second mode the bypass logic is activated and the timer is preset directly bypassing the preset register, wherein upon activation of the watchdog timer unit operates in the second mode and the bypass logic is activated and upon receipt of a first clear watchdog signal, the watchdog timer unit operates in the first mode and the timer is preset through the preset register.

7. The watchdog timer unit according to claim 6, wherein the timer is preset directly through a central processing unit.

8. The watchdog timer unit according to claim 6, wherein the timer is preset directly through a start-up configuration register.

9. The microcontroller comprising a watchdog timer unit according to claim 6, further comprising:
a central processing unit coupled with a plurality of peripheral devices through a system bus,
wherein the central processing unit is programmable to generate clear watchdog signals fed to the watchdog timer unit and wherein the watchdog timer unit is configured to generate a watchdog timeout signal for resetting the microcontroller.

10. The microcontroller according to claim 9, wherein the timer is preset directly through the central processing unit.

11. The microcontroller according to claim 9, wherein the timer is preset directly through a start-up configuration register of the microcontroller.

12. A microcontroller comprising a watchdog timer unit according to claim 1, further comprising:
a central processing unit coupled with a plurality of peripheral devices through a system bus,
wherein the central processing unit is programmable to generate clear watchdog signals fed to the watchdog timer unit and wherein the watchdog timer unit is configured to generate a watchdog timeout signal for resetting the microcontroller.

13. The microcontroller according to claim 12, wherein activation of the watchdog timer unit is performed automatically when the microcontroller is powered up thereby selecting the first watchdog time period and after receipt of the first clear watchdog signal generated by the central processing unit, the watchdog timer unit is configured to switch to the second timer.

14. The microcontroller according to claim 12, further comprising an inverter coupled with an output of the second timer, wherein the watchdog timer unit further receives a power fail signal, wherein the logic is further configured to select between the first timer, the second timer and the output of the inverter, and wherein the watchdog timer unit selects the output of the inverter when a clear watchdog signal and a power fail signal is received.

15. The microcontroller according to claim 12, wherein the first watchdog time period is defined by a first timer receiving the first clock signal and the second watchdog time period is defined by a second timer receiving the second clock signal, wherein a first clear watchdog signal switches the watchdog timer unit from the first timer to the second timer.

16. The microcontroller according to claim 15, further comprising a clock generating unit configured to generate the first clock fed to the first timer and the second clock fed to the second timer.

17. The microcontroller according to claim 15, further comprising a flip-flop being controlled by the clear watchdog signal and having an output controlling a switch that couples a reset output of the watchdog timer unit with either the output of the first or second timer.

18. The microcontroller according to claim 12, comprising a clock generating unit configured to generate the first clock signal and the second clock signal.

19. A microcontroller comprising:
a central processing unit coupled with a plurality of peripheral devices through a system bus; and
a watchdog timer unit receiving a clear watchdog signal and a clock signal and comprising a timer receiving said clock signal and a flip-flop being controlled by the clear watchdog signal and having an output controlling a switch that couples a reset output of the watchdog timer unit with either the output of the timer or a logic 1, wherein after activation of the watchdog timer unit, the flip-flop is controlled to select the logic 1 until a first clear watchdog signal has been received whereupon the switch is controlled to select the output of the timer and wherein the watchdog timer unit is further configured to reset said timer upon receipt of further clear watchdog signals.

20. A method for monitoring the execution of a program in a microcontroller through a watchdog timer unit defining a time period which after expiration resets the microcontroller wherein expiration of the time period is prevented by periodically resetting the watchdog timer unit, the method comprising:
after activation of the watchdog timer unit, the watchdog timer unit automatically starts a first watchdog time period until a first clear watchdog signal has been received by selecting a first clock signal to clock the watchdog timer unit;
generating the first clear watchdog signal by a central processing unit of the microcontroller; and
upon receipt of the first clear watchdog signal and following clear watchdog signals, the watchdog timer unit automatically starts a second watchdog time period which is shorter than the first watchdog time period by selecting a second clock signal to clock the watchdog timer unit.

21. The method according to claim 20, wherein a power-up of the microcontroller automatically activates the watchdog timer unit.

22. The method according to claim 20, wherein the first watchdog time period is defined by a first timer clocked by the first clock signal and the second watchdog time period is defined by a second timer clocked by the second clock signal, the method comprising the step of switching the watchdog timer unit from the first timer to the second timer upon receipt of the first clear watchdog signal.

23. The method according to claim 20, further comprising: upon receipt of a clear watchdog signal and a power fail signal the watchdog timer unit is configured to maintain a reset signal for predefined time period.

24. The method according to claim 23, wherein the predefined time period is defined by the second watchdog time period.

25. A method for monitoring the execution of a program in a microcontroller through a watchdog timer unit defining a time period, which wherein after expiration of the time period, the watchdog timer unit generates a reset signal at an output of the timer unit which resets the microcontroller wherein expiration of the time period is prevented by periodically resetting the watchdog timer unit, the method comprising:

after activation of the watchdog timer unit, an output of the watchdog timer unit is switched to a logic 1 signal thereby preventing a reset of the microcontroller;

generating a first clear watchdog signal by a central processing unit of the microcontroller; and upon receipt of the first clear watchdog signal the output of the watchdog timer unit is coupled with an output of a watchdog timer within the watchdog timer unit; and upon receipt of following clear watchdog signals, the watchdog timer is reset thereby preventing the reset of the microcontroller.

\* \* \* \* \*